3,258,435
PROCESS FOR MANUFACTURING ANION-EXCHANGE MEMBRANES FROM A GRAFT COPOLYMER OF SBR AND A VINYLPYRIDINE REACTED WITH AN EPOXY RESIN
Riichiro Imoto, Yujiro Kosaka, and Akihiko Shimizu, Tsuno-gun, Yamaguchi-ken, Japan, assignors to Toyo Soda Mfg. Co., Ltd., Tsuno-gun, Yamaguchi-ken, Japan
No Drawing. Filed June 14, 1962, Ser. No. 202,382
5 Claims. (Cl. 260—2.1)

The present invention is concerned with a process for manufacturing anion-exchange membranes having great mechanical strength, excellent electrochemical properties and high resistance to the passage of divalent anions through them. Briefly stated, this process comprises preparing a solution containing a graft polymer by graft-polymerizing a monovinylpyridine derivative onto a high-molecular polyolefinic compound in the presence of a peroxide catalyst while keeping the reaction components and the catalyst as a whole in a liquid phase in a solvent inert to the epoxy radical, adding an epoxy compound soluble in said solvent and having at least one epoxy radical to the above mentioned graft polymer solution, thereby producing a viscous liquid, and shaping the produced viscous liquid into a membrane while the membrane matrix continues, in the absence of any applied heat and pressure, to undergo the reactions of cross-linking formation and strong basicity provision.

In general, anion-exchange membranes are manufactured by making an anion-exchange resin into a thin film. They thus inevitably swell and shrink when brought into contact with an aqueous solution. Thus, the ordinary ion-exchange membranes, in spite of their highly cross-linked structure, still swell and shrink as illustrated by the fact that ion exchange membrane preparations having dimensions greater than 1 m. square, when used for industrial purposes, usually show great changes in length, e.g. several centimeters. It is necessary for such membranes, therefore, to be not only highly cross-linked but also have a sufficient flexibility to withstand swelling and shrinking.

The process of the present invention is very suitable for obtaining anion-exchange membranes which satisfy the foregoing desiderata. They also possess excellent electrochemical characteristics and strongly adhere to the supporting backbone even after they have undergone swelling and shrinking.

All prior methods of manufacturing homogeneous anion-exchange membranes containing strongly basic groups are either an improvement or a modification of the ordinary methods employed in manufacturing spherical products of anion-exchange resins. In these processes it is necessary, after shaping the resins into membranes, to subject the resins to at least two of the following reactions: chloromethylation, amination, and/or quaternarization. The resulting resin must then be cross-linked by vulcanization or thermal treatment.

It is undesirable, however, to subject a thin film to the above-noted reactions and high temperatures because inter alia it is uneconomical as well as producing a poor yield of membrane.

No process has heretofore been discovered which allows the preparation of membrane-shaped products by simultaneously cross-linking and quaternarization as is the case with the process of the present invention. When manufacturing industrially available membranes having a size in excess of 1 m. square by any of the known methods, it is impossible to obtain actually usable membranes with a yield greater than 80% based on the total weight of the product.

According to the process of the present invention, membraneous products which are sufficiently solid and have a strong basicity can be obtained in a single run. Moreover, the process of the present invention makes it possible to manufacture membraneous products which have excellent electrochemical properties, high resistance to the passage of divalent anions through them and sufficient flexibility to withstand the destructive effect of swelling or shrinking exerted by the resinous material constituting the membrane matrix as it is brought into contact with a salt solution. The great flexibility also presents the membrane from undergoing local stress and permanent deformation which is normally produced when membranes have an uneven thickness. Thus, according to the process of the present invention, anion-exchange membranes having an area of 1 m. square and greater can be manufactured in very high yields.

The process of the present invention is carried out by preparing a first reaction component in solution by dissolving vinylpyridine or alkylvinylpyridine in a solvent inert to epoxy compounds, particularly an aromatic hydrocarbon such as benzene, toluene or xylene. A second reaction component is prepared by adding a refined preparation of a high-molecular polyolefinic compound such as, for example, polybutadiene, butadiene-styrene copolymer and the like with 1–10% of a peroxide polymerization catalyst such as benzoylperoxide and causing the reaction to proceed at a temperature of 50–80° C. by gradually adding said second reaction component to said first reaction component.

A reaction carried out according to the above procedure graft polymerizes the vinyl pyridine on the high-molecular polyolefinic compound. The quantitative ratio of the high-molecular polyolefinic compound to the vinylpyridine is optionally variable between 5–50% by weight.

In carrying out graft polymerization for 2–48 hours, a solution is produced which contains a graft polymer soluble in said solvent.

The grafting efficiency of the graft polymer contained in this solution is 20–80%

In preparing the aforementioned viscous solution the polymer solution prepared as above is added, per 1 equivalent of pyridine nucleus contained in the solution, to 0.5–1.5 equivalents of an epoxy compound, for example, a diepoxy compound having at least one epoxy group.

The epoxy compound must be soluble in every solvent employed in the preliminary graft polymerization.

A cloth or net made of an alkali-resistant synthetic fiber is dipped in the viscous solution prepared as above till it becomes thoroughly saturated with the solution. Any excess of the solution is then removed by squeezing the cloth or net thus treated. When the squeezed cloth or net is further treated, at room temperature, to remove the solvent by evaporation, the epoxy compound, the vinylpyridine and double bonds of a yet unchanged portion of the polyolefinic compound are incidentally reacted with one another so that a cross-linked three dimensional structure, which is necessary for an ion-exchange membrane is formed while 5–8% of nitrogen atoms of pyridine are changed by the reaction between the epoxy group and the pyridine nitrogen, into radicals useful for forming a quarternary pyridinium base.

The degree of cross-linkage and quarternization is variable according to the reaction time and the type of epoxy compound employed. It is also possible to add to the reaction system in the latter half of the graft polymerization period an alkyl halide in order to further raise the degree of quarternization.

Reaction resulting in hardening, quarternization, etc., are conducted by allowing the product to stand in air for 5–96 hours. The membraneous product thus hardened to an appropriate extent is cut into pieces of desired shape and quickly brought into contact with a large quantity of sea water and a dilute solution of acid or alkali so that no excessive hardening takes place thereafter.

The matrix of the thus prepared membrane has a strong adhesion to synthetic fibers having either a polar or non-polar structure. It also has sufficient flexibility so as to

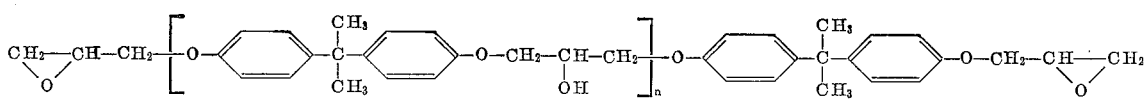

keep the membrane highly stable against an abrupt change not only in the reaction but also in the surrounding liquid phase and to protect the membrane from cracking.

Moreover, the degree of elongation and shrinkage in the direction of the membrane face is very small. For example, the change in length taking place in response to a concentration change in a common salt solution from saturation to 3% does not exceed 1%.

A further advantage of the membrane manufactured as above is that the membrane is very selective in that it permits monovalent anions to pass through it with ease and divalent anions only with great difficulty. Thus, in the body of the membrane prepared according to the process of the present invention, the mobility of the chlorine ion is 5–10 times as great as that of the sulfate ion.

The high-molecular polyolefinic compounds usable in the process of the present invention are polymers produced by homopolymerization or copolymerization of monomers having conjugated double bonds and include polybutadiene, styrene-butadiene copolymer, polyisoprene and the like with a proviso that they are soluble in hydrocarbons, particularly aromatic hydrocarbons.

Vinylpridine derivatives which may be used are, e.g. 4-vinylpyridine, 2-vinylpyridine, 2-methyl-5-vinylpyridine and 5-ethyl-2-vinylpyridine or vinylpyridines having an alkyl substituent attached to a carbon atom of the pyridine nucleus.

As epoxy compounds usable in the process of the present invention, there may be mentioned such epoxy compounds as produced by the reaction of epichlorohydrin with diphenylolpropanes as well as the reaction products between polyvalent alcohols and epichlorohydrin, and pounds produced in the partial oxidation of polybutadiene mixtures thereof. The high-molecular polyepoxy com- or copolymers of butadiene may also be employed. All such epoxy compounds as above-mentioned, however, must be soluble in hydrocarbons inert to epoxy compounds.

The process of the present invention requires no after treatment after shaping the membrane. In addition, since the membraneous products are flexible and strong, the shaped membranes can be used per se. The yield of usable membrane is thus 98–100%.

The following are presently preferred specific embodiments, it being understood that they are merely illustrative and not limitative.

*Example 1*

60 parts of 2-methyl-5-vinylpyridine (abridged hereinafter as MVP), 66 parts of a 10% solution of a styrene-butadiene synthetic rubber (styrene content=23.5%; abridged hereinafter as SBR) in toluene, 3.5 parts of benzoylperoxide (abridged hereinafter as BPO) and 40 parts of toluene are thoroughly admixed and reacted for 4 hours at 70° C. Polymerization is then stopped by the addition of p-phenylenediamine. The graft efficiency $f$ of MVP upon SBR (amount of MVP combined as branches onto SBR molecule/total amount of MVP employed×100) is 53%.

To 28.2 parts of the above-prepared solution of graft polymer are added 6 parts of Epikote No. 562 (registered trade mark; abridged hereinafter as E–562) and 2 parts of Epikote 562 is a liquid aliphatic type of epoxy resin as shown in the publication by Irving Skeist, "Epoxy Resins", Reinhold Publishing Corp., 1958, pages 16 through 21.

Epikote 828 is a liquid epoxy resin produced by the reaction of epichlorohydrin with diphenylol-propane. It has the following general chemical formula The viscosity of the mixture of the graft polymer, E–562 and E–828 is adjusted by adding 50 parts of toluene. A 5-mesh screen of 360-denier Saran yarn (a vinylidene chloride-vinyl chloride copolymer; see "Man-Made Textile Encyclopedia," edited by J. J. Press, Textile Book Publishers, Inc., New York, 1959, pages 132 and 133) having a dimension of 1 meter by 10 meters is saturated with the viscose solution by dipping said screen in said solution. After removing any excess solution by squeezing, the thus-obtained membraneous product is hardened by allowing it to stand at room temperature for 48 hours. The hardened membrane is then cut into squares having an area of 1 meter which are then placed in sea water for twenty-four hours and then dipped in a 0.5 normal aqueous solution of common salt.

Using the above-prepared anion-exchanging membrane, the transport number of the chloride ion through the product of the present invention was measured at 15° C. as follows: An electrolysis chamber was divided into two compartment using the membrane as a divider. The compartments were filled, respectively, with a 0.5 normal and 2.5 normal aqueous common salt solution and a silver chloride electrode inserted in each. From the potential difference found between these two electrodes the transport number in the 1.5 N common salt solution was calculated.

The electric resistance of the membrane in the 0.5 N common salt solution was measured at 15° C.

The membraneous products manufactured in this example proved to have a transport number of 0.92, a specific resistance of 190Ω.cm., a thickness of 0.35 mm., a $C_t$ value of 1.68 meq./g. (the total exchange capacity as dry membrane) and neutral salt splitting capacity $C_r$ of 0.42 meq./g.

The ratio of the mobility of $SO_4^{--}$ to that of $Cl^-$. $U_{SO_4^{--}}/U_{Cl^-}$, found in concentrating a sample of sea water while applying a current density of 1.5 A./dm.$^2$ was 0.09. Yield of the finished membraneous product was 98%.

*Example 2*

A reaction analogous to that in Example 1 is carried out except that 40 parts of MVP, 100 parts of 10% solution of SBR in toluene, 2.63 parts of BPO and 30 parts of toluene were employed.

A graft efficiency $f$ of 50% was found for the produced polymer.

Thoroughly mixing together 43 parts of the above-obtained toluene solution of this graft polymer, 6 parts of E–562, 2 parts of E–828 and 50 parts of toluene, the mixture is manufactured into membraneous products by following a procedure similar to that in Example 1.

The following data were obtained: Transport number, 0.91; specific resistance, 150Ω.cm.; $C_t=1.48$ meq./g.; $C_r=0.34$ meq./g.; $U_{SO_4^{--}}/U_{Cl^-}=0.2$.

Example 3

In a manner similar to that of Example 1, 30 parts of MVP, 129 parts of 10% solution of SBR in toluene, 2 parts of BPO and 20 parts of toluene were admixed. The reaction product was a polymer having a graft efficiency $f$ of 48%. A mixture was prepared containing 60 parts of a toluene solution containing the above graft polymer, 6 parts of E-562, 2 parts of E-828 and 50 parts of toluene. Pieces of membraneous product were prepared in the same manner as in Example 1. The following data were obtained for the present product: Transport number, 0.88; specific resistance 120Ω.cm.; $C_t=1.30$ meq./g.; $C_r=0.22$ meq./g.; $U_{SO_4^{--}}/U_{Cl^-}=0.2$.

Example 4

With the exception that 0.5 parts of BPO were used, the same composition as in Example 2 was reacted for 48 hours at 70° C. A polymer having a graft efficiency $f$ of 80% was obtained. From a solution of this polymer product, a membraneous product was prepared under the same conditions as in Example 2, for which the following data were found: Transport number, 0.93; specific resistance, 120Ω.cm.; $C_t=1.49$ meq./g.; $C_r=0.36$ meq./g.; $U_{SO_4^{--}}/U_{Cl^-}=0.15$.

Example 5

A mixture the same as that in Example 2, but using 1.5 parts of BPO, was reacted for 7 hours at 70° C., producing a polymer having a graft efficiency $f$ of 20%.

From a solution of this polymer product, a membraneous product was prepared under the same condition as in Example 2, which had the following properties: Transport number, 0.86; specific resistance, 100Ω.cm.; $U_{SO_4^{--}}/U_{Cl^-}=0.12$; $C_t=1.48$ meq./g.; $C_r=0.38$ meq./g.

Example 6

A mixture of the same composition as in Example 2 except that it contained 3.5 parts of BPO, was reacted for 3 hours at 70° C. A polymer was produced which had a graft efficiency $f$ of 44%. A membraneous product prepared in the same manner as Example 2 gave the following data: Transport number, 0.90; specific resistance, 110Ω.cm.; $C_t=1.47$ meq./g.; $C_r=0.40$ meq./g.; $U_{SO_4^{--}}/U_{Cl^-}=0.16$.

Example 7

With the exception that 0.5 parts of BPO were used, a mixture of the same composition as in Example 2 was kept in reaction for 2 hours at 70° C. There was thus obtained a polymer product having a graft efficiency $f$ of 30%. The membraneous product prepared in the manner of Example 2 was found to have the following properties: Transport number, 0.87; specific resistance, 103Ω.cm.; $C_t=1.49$ meq./g.; $C_r=0.42$ meq./g.; $U_{SO_4^{--}}/U_{Cl^-}=0.18$.

Example 8

A starting mixture of the same composition as in Example 2 was reacted for 7 hours at 50° C., leading to the formation of a polymer having a graft efficiency $f$ of 33%. A membraneous product manufactured in the same manner as in Example 2 had the following properties: Transport number, 0.87; specific resistance 105Ω.cm.; $C_t=1.43$ meq./g.; $C_r=0.50$ meq./g.; $U_{SO_4^{--}}/U_{Cl^-}=0.17$.

Example 9

A starting mixture having the same composition as in Example 2 was reacted for 7 hours at 60° C. There was produced a polymer having a graft efficiency $f$ of 42%. A membraneous produce obtained in the same manner as in Example 2 had the following properties: Transport number 0.90; specific resistance, 108Ω.cm.; $C_t=1.49$ meq./g.; $C_r=0.40$ meq./g.; $U_{SO_4^{--}}/U_{Cl^-}=0.19$.

Example 10

A starting mixture containing the same ingredients as in Example 2 was reacted for 2 hours at 80° C. A polymer was thus produced which had a graft efficiency $f$ of 40%. A membraneous product obtained by the procedure of Example 2 had the following properties: Transport number, 0.91; specific resistance, 160Ω.cm.; $C_t=1.47$ meq./g.; $C_r=0.35$ meq./g.; $U_{SO_4^{--}}/U_{Cl^-}=0.11$.

Example 11

In a manner similar to that described in Example 2, a membraneous product was prepared using a polyethylene screen instead of the Saran screen. The resulting product had the following properties: Transport number, 0.91; specific resistance, 140Ω.cm.; $C_t=1.48$ meq./g.; $C_r=0.36$ meq./g.; $U_{SO_4^{--}}/U_{Cl^-}=0.13$.

Example 12

A mixture consisting of 43 parts of the graft polymer produced in Example 2, 8 parts of E-562, 1 part of E-828 and 50 parts of toluene was prepared. A membraneous product was produced therefrom by the process described in Example 2. The following data was found for this product: Transport number, 0.95 specific resistance 75Ω.cm.; $C_t=1.41$ meq./g.; $C_r=0.33$ meq./g.; $U_{SO_4^{--}}/U_{Cl^-}=0.15$.

Example 13

From a mixture composed of 43 parts of the graft polymer produced in Example 2, 4 parts of E-562, 4 parts of E-828 and 50 parts of toluene, a membraneous product was prepared in the same manner as in Example 2. The product thus obtained had the following properties: Transport number, 0.95; specific resistance, 250Ω.cm.; $C_t=1.49$ meq./g.; $C_r=0.31$ meq./g.; $U_{SO_4^{--}}/U_{Cl^-}=0.1$.

What is claimed is:

1. A method for the preparation of an anion-exchange membrane having substantially no permeability to divalent anions and large permeability to monovalent anions which comprises graft-polymerizing monovinyl alkylpyridine onto a styrene-butadiene copolymer in aromatic hydrocarbon solvent which is inert to the epoxy radical contained in a glycidyl polyether having an epoxy equivalent greater than 1.0 selected from the group consisting of glycidyl polyethers of polyhydric phenols and polyhydric alcohols, admixing the resulting viscous solution of graft-polymer with 0.5–1.5 equivalents per one equivalent of pyridine contained in the graft-polymer of a glycidyl polyether having an epoxy equivalency greater than 1.0 and selected from the group consisting of glycidyl polyethers of polyhydric phenols and polyhydric alcohols, said glycidyl polyether being soluble in said solvent, dipping a synthetic fiber net selected from the group consisting of a vinylidene chloride and vinyl chloride copolymer and polyethylene in said viscous solution thereby producing a membrane of said viscous solution on said net, and evaporating said solvent from said viscous solution on said net, the reaction between said graft-polymer and said glycidyl polyether taking place simultaneously with the evaporation of said solvent.

2. Method according to claim 1 wherein the graft-polymerization takes place in the presence of benzoyl peroxide.

3. Method according to claim 1 wherein the monovinyl alkylpyridine is 2-methyl-5-vinyl pyridine.

4. Method according to claim 1 wherein the aromatic hydrocarbon solvent is toluene.

5. Method according to claim 1 wherein the graft-polymerization between the monovinyl alkylpyridine and styrene-butadiene copolymer is from 2 to 48 hours.

References Cited by the Examiner

UNITED STATES PATENTS

| | | | |
|---|---|---|---|
| 2,469,683 | 5/1949 | Dudley | 260—2.1 |
| 2,543,666 | 2/1951 | Michael | 260—2.1 |

FOREIGN PATENTS 872,217  7/1961  Great Britain.

OTHER REFERENCES

Chen et al., Journal of Polymer Science, vol. 23, pp 903–913; p. 910 relied on, Feb. 1957.

Helfferich, Ion Exchange, pp. 49–50, McGraw-Hill Book Co., New York, 1962 (first published in Germany in 1959).

WILLIAM H. SHORT, *Primary Examiner.*

LOUISE P. QUAST, *Examiner.*

J. C. MARTIN, C. A. WENDEL, *Assistant Examiners.*